July 11, 1950  J. D. TUCKER  2,514,460
WHEEL MOTOR UNIT
Filed May 7, 1946  2 Sheets-Sheet 1

INVENTOR.
Jesse D. Tucker
BY
ATTYS

July 11, 1950     J. D. TUCKER     2,514,460
WHEEL MOTOR UNIT
Filed May 7, 1946     2 Sheets-Sheet 2
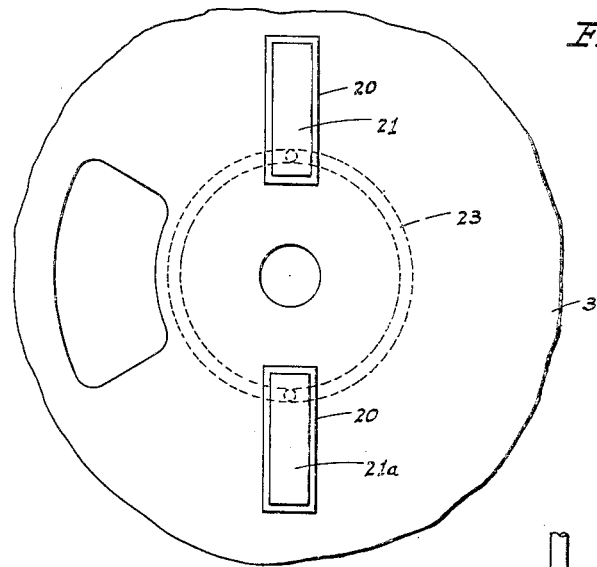
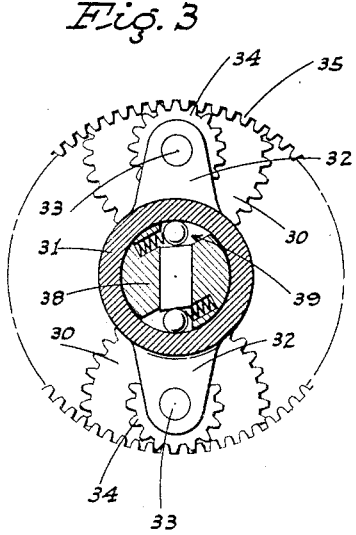
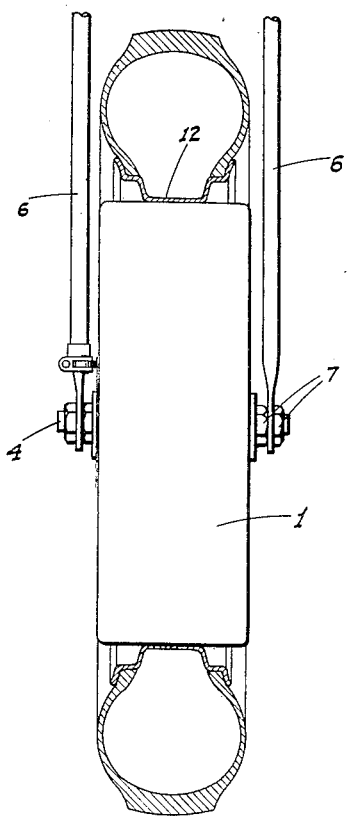
INVENTOR.
Jesse D. Tucker
BY
ATTYS Patented July 11, 1950

2,514,460

UNITED STATES PATENT OFFICE 2,514,460

WHEEL MOTOR UNIT

Jesse D. Tucker, Huntington Park, Calif.

Application May 7, 1946, Serial No. 667,979

2 Claims. (Cl. 172—287)

This invention is directed to, and it is an object to provide, a novel wheel motor unit; i. e., a motor unit incorporated in a wheel as a unitary part thereof and in driving relation to such wheel.

Another object of the invention is to provide a wheel motor unit especially useful for bicycles, scooters, and other wheel-supported vehicles; the prime mover included in the unit being an electric motor.

A further object of the invention is to provide a wheel motor unit which is compact, simple in construction, and relatively light weight, though effective, through a novel reduction gear assembly, to impart reduced speed to the wheel when the included electric motor is energized.

An additional object of this invention is to provide a wheel motor unit which incorporates an overrunning clutch assembly operative to permit the wheel to run free of the electric drive motor and gear assembly when the same are not in operation.

A further object of the invention is to provide a practical wheel motor unit, and yet one which will be exceedingly effective for the purpose for which it is designed.

These objects are accomplished by means of such structure and relative arrangement of parts as will fully appear by a perusal of the following specification and claims.

In the drawings:

Fig. 2 is a fragmentary elevation, from the inside, of the removable side plate of the rotary case, and which side plate supports the brushes of the electric motor.

Fig. 3 is a fragmentary sectional elevation of the planetary gear assembly and the clutch.

Fig. 4 is an end elevation of the motor as arranged in combination with a different type of tire rim.

Figure 1:
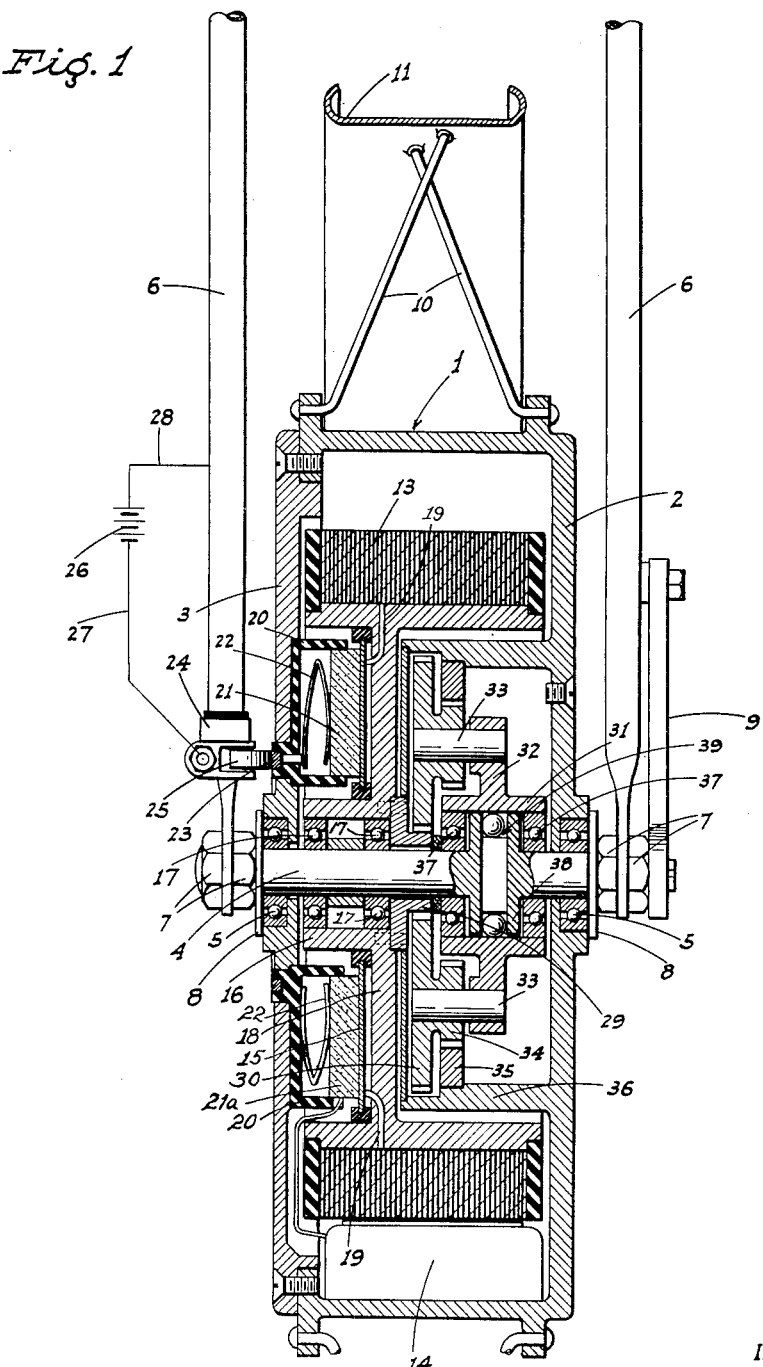
Fig. 1 is a transverse section of the wheel motor unit.

Referring now more particularly to the characters of reference on the drawings, the wheel motor comprises a circular rotary case 1 of hollow construction, said case including an integral side wall 2, and a removable side wall 3 on the opposite side. The rotary case 1 is axially supported by a fixed spindle 4, there being bearings 5 between the side walls of the case and said fixed spindle. The spindle 4 is threaded at opposite ends, and is secured to the outer ends of a wheel fork 6 by means of a pair of lock nuts 7; there being a protective or spacer washer 8 between each of the innermost nuts 7 and the adjacent bearing 5. A torque arm 9 on the spindle and connected to one leg of the fork assures against rotation of said spindle.

The rotary case 1 is thus disposed between the legs of the fork 6, and said case, in combination with spokes 10 and a rim 11, forms a wheel for a tire. In the form shown in Fig. 1, the motor unit is incorporated in a bicycle-type wheel, whereas in Fig. 4 such unit is incorporated in a scooter-type wheel. In this latter embodiment a drop center rim 12 is fixed directly to the periphery of the case 1, without spokes therebetween.

Within the rotary case 1 the unit includes an electric motor, and a reduction gear train, both being constructed as follows:

An annular or ring-type armature 13 runs in the case 1 adjacent but short of the periphery thereof; there being field coils 14 mounted in said case on the periphery thereof, and between the latter and said armature. The armature includes a radially inwardly extending, supporting flange or disc 15 having a central hub 16 thereon. The hub 16 extends from the supporting disc 15 laterally outwardly towards the removable side wall 3, and said hub is turnably supported, from the spindle 4, by bearings 17.

A laterally facing, dielectrically supported commutator member 18 of radially slotted disc-like form is mounted, for rotation with the armature, in adjacent but spaced relation to the supporting disc 15 on the side facing the removable wall 3; there being leads 19 which connect between the ring 18 and the armature 13.

At diametrically spaced points the removable wall 3 is formed with laterally inwardly opening diametrically opposed dielectric guides 20 in which brushes 21 and 21a are slidably mounted for engagement, in face-to-face relation, with the commutator member 18. The brushes 21 are urged into engagement with the member 18 by leaf-type compression springs 22 disposed between said brushes and the bottom of the dielectric guides 20. The spring 22 of brush 21 also serves to establish the electrical contact between said brush and an external collector ring 23 mounted on the outside of the removable wall 3 in dielectric relation thereto, and in electrical connection with said spring. The brush 21a is electrically connected to the field coils 14 as indicated.

A bracket 24 is mounted on the adjacent leg of the fork 6 in insulated relation therefrom, and said bracket includes a roller 25 running on the external ring 23, which ring is concentric to the spindle 4.

The feed circuit is shown diagrammatically in

Fig. 1 and includes a battery 26 mounted at a suitable point on the vehicle, there being one lead 27 extending from the battery to the roller bracket 24, and another lead 28 grounded to the vehicle frame, here shown as the fork 6 and to which the field coils are connected by the intermediate metal parts. A control switch (not shown) is interposed at any suitable point in said circuit.

When the above described circuit is closed, the armature 13 is energized through the medium of the described brush arrangement, whereby to effect operation of the unit.

In order that a gear reduction be obtained between the armature 13 and the rotary case 1, the following arrangement is provided:

Adjacent the spindle 4 and on the inner end of the central hub 16, the armature is provided with a pinion 29 which meshes, on opposite sides, with relatively large-diameter gears 30 of a planetary type of gear assembly which includes a hub 31 having oppositely projecting radial arms 32, each of which carries a fixed stub shaft 33 projecting laterally inwardly in parallelism to the spindle 4. The relatively large-diameter gears 30 are rotatably mounted on corresponding ones of said stub shafts 33.

Each gear 30 includes, in integral relation, a pinion 34 which runs in mesh with an internal ring gear 35 fixed in connection with a concentric, laterally inwardly projecting flange 36 formed in the rotary case 1, and projecting to a termination adjacent but short of the supporting disc 15 of armature 13. The chamber in which the gearing assembly is disposed is sealed from the remainder of the interior of the case 1 by suitable partitioning and sealing, whereby the lubricant for the gears cannot gain access to the electrical apparatus.

A one way clutch is arranged between the spindle 4 and hub 31 in the manner and for the purpose now described.

The hub 31 is rotatably supported, from the spindle 4, by spaced bearings 37, and said spindle is formed, between said bearings, with an enlarged annular head 38. Said head is provided, within the hub 31, with an overrunning clutch here of the ball type, as indicated at 39. Such clutch overruns when the electric motor is not in operation, and thus permits the wheel to run free about the spindle 4 without drag introduced thereon by the wheel motor unit. However, when the armature 13 is energized, and the wheel motor unit in operation, the hub 31 is initially rotated, by the described gearing, in a direction whereby the clutch 39 locks said hub against further rotation in such direction. Thereafter, with the hub 31 and arms 32 remaining stationary, the armature and rotary case relatively rotate to turn the case and wheel in a forward direction; the gearing reducing the speed to desired limits.

With the described wheel motor unit, an effective and forceful drive is imparted to the wheel, and—as is evident—the gear reduction can be incorporated in any ratio desired by slight changes in the planetary gear assembly.

In multiple-wheel vehicles, one of the wheel motor units may be incorporated in each wheel if desired, and in a four-wheel vehicle, for example, this would eliminate the necessity of a differential, front wheel drive toggles, as well as other parts. This simplifies the vehicle structure, reducing its weight and eliminating many parts now conventional to a vehicle drive assembly.

In the above wheel motor unit the drive is enhanced by reason of the fact that the power on the wheel, or rotation thereof, results both from the reaction of the field coils on the rotary case, and turning of the armature which drives through the described gearing.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A wheel motor unit comprising a rotary case to support a wheel tire, a fixed spindle on which the case is axially and rotatably mounted, a motor within the case, such motor including an armature disposed within the case and mounted for rotation axially about the spindle, electrical means to activate the motor including such armature, and a drive connection between the armature and the case, such drive connection including a hub disposed axially about the spindle, an overrunning clutch between the hub and spindle effective to lock the hub stationary with respect to the spindle when the hub rotates in one direction, and a gear train connected in driving relation between the armature and the hub and case and effective only upon rotation of the armature in one direction to first lock the hub stationary with respect to the spindle and to then drive the case.

2. A wheel motor unit as in claim 1 in which the gear train includes a pinion on the armature, radially projecting arms on the hub, stub shafts on the arms, gears on the stub shafts in mesh with the pinion on the armature, a pinion integral with each gear on the stub shafts, and an internal ring gear fixed on the case, the last named pinions meshing with said ring gear.

JESSE D. TUCKER.

REFERENCES CITED

The following references are of record in the file of this patent:

UNITED STATES PATENTS

| Number | Name | Date |
|---|---|---|
| 552,271 | Bolton | Dec. 31, 1895 |
| 613,894 | Vaughan-Sherrin | Nov. 8, 1898 |
| 680,804 | Newman et al. | Aug. 20, 1901 |
| 1,118,616 | Apple | Nov. 24, 1914 |
| 1,323,245 | Borkes | Dec. 2, 1919 |
| 2,441,801 | Dever | May 18, 1948 |

FOREIGN PATENTS

| Number | Country | Date |
|---|---|---|
| 424,820 | Great Britain | Feb. 28, 1935 |
| 512,469 | Great Britain | Sept. 18, 1939 |
| 514,020 | Great Britain | Oct. 27, 1939 |
| 327,879 | France | Apr. 18, 1903 |
| 228,334 | Germany | Nov. 8, 1910 |
| 446,955 | Germany | July 13, 1927 |